United States Patent
Holzapfel et al.

[11] Patent Number: 5,941,566
[45] Date of Patent: Aug. 24, 1999

[54] BELT HEIGHT ADJUSTER FOR A VEHICLE SAFETY BELT SYSTEM

[75] Inventors: Volker Holzapfel, St. Wendel; Jürgen Petzi, Geislingen-Eybach, both of Germany

[73] Assignee: TRW Occupant Restraint Systems GmbH, Alfdorf, Germany

[21] Appl. No.: 08/838,369

[22] Filed: Apr. 8, 1997

[30] Foreign Application Priority Data

Apr. 10, 1996 [DE] Germany ............... 296 06 526 U

[51] Int. Cl.⁶ ............................................. B60R 22/20
[52] U.S. Cl. ............................................. 280/801.2
[58] Field of Search ........................... 280/801.2, 808

[56] References Cited

U.S. PATENT DOCUMENTS

| | | | |
|---|---|---|---|
| 4,989,900 | 2/1991 | Steinhüser | 280/801.2 |
| 5,482,325 | 1/1996 | Möller et al. | 280/801.2 |

FOREIGN PATENT DOCUMENTS

| | | |
|---|---|---|
| 59-8351 | 1/1984 | Japan . |
| 59-55547 | 4/1984 | Japan . |
| 59-145942 | 9/1984 | Japan . |
| 60-40370 | 5/1985 | Japan . |
| 62-132854 | 8/1987 | Japan . |
| 63-202551 | 12/1988 | Japan . |
| 455450 | 5/1992 | Japan . |
| 537610 | 5/1993 | Japan . |
| 68794 | 1/1994 | Japan . |
| 72054 | 1/1995 | Japan . |
| 7144603 | 6/1995 | Japan . |

*Primary Examiner*—Kenneth R. Rice
*Attorney, Agent, or Firm*—Tarolli, Sundheim, Covell, Tummino & Szabo

[57] ABSTRACT

A belt height adjuster for a vehicle safety belt system comprises a U-shaped, vehicle-fixed rail and a sled adapted to slide in the rail. The rail has side flanges and a transverse flange and detent openings and comprises at least one pawl and a pin extending perpendicularly to the transverse flange. The pawl is pivotally mounted on the sled by means of the pin and is movable from a neutral position in which displacement of the sled is permitted into a locking position in which the pawl engages one of the side flanges and jams the sled in the rail. The pawl is so eccentrically and pivotally mounted on the sled that, in response to a downwardly directed acceleration, the pawl able to pivot out of the neutral position into the locking position.

10 Claims, 5 Drawing Sheets

BELT HEIGHT ADJUSTER FOR A VEHICLE SAFETY BELT SYSTEM

TECHNICAL FIELD

The invention relates to a belt height adjuster for a vehicle safety belt system.

BACKGROUND OF THE INVENTION

By means of a belt height adjustment means the run of a safety belt may be optimally adapted to the stature of a vehicle occupant in each case. Usually a deflector fitting for the belt system is adjusted in height involving the use of a detent mechanism which engages the desired detent opening in a rail. If, however, the position of the sled is not so exactly set that the detent mechanism can snap into a detent opening but remains between two detent openings, then the tension force occurring in the safety belt will result in a displacement of the sled in an accident so that the restraining action desired of the safety belt is not obtained as early on as desired. This problem is made even more acute, if the safety belt system is provided with a belt pretensioner which is to eliminate the belt slack from the belt system in case of an accident. The forces thereby additionally exerted on the belt height adjuster may even result in the detent mechanism fails to snap into the next detent opening after the displacement of the sled and slips thereover, as a result of which the effect normally to be produced by the belt pretensioner is impaired. Therefore, detent mechanisms have been proposed which intend to ensure engagement of the corresponding next detent opening when the sled is caused to move downwards relative to the vehicle with a high acceleration rate. Such known detent mechanisms are, however, not sufficiently reliable in operation so that, even if they are used, the action of the belt pretensioner may still be impaired.

BRIEF SUMMARY OF THE INVENTION

The invention provides a belt height adjuster which, when the detent mechanism does not engage the detent opening, prevents a displacement of the sled under the action of tension in the safety belt, more particularly, when used in conjunction with belt pretensioning. The belt height adjuster according to the invention comprises a U-shaped, vehicle-fixed rail and a sled adapted to slide in the rail. The rail has side flanges, a transverse flange and detent openings and comprises at least one pawl and a pin extending perpendicularly to the transverse flange. The pawl is pivotally mounted on the sled by means of the pin and is movable from a neutral position in which displacement of the sled is permitted into a locking position in which the pawl engages one of the side flanges and jams the sled in the rail. The pawl is so eccentrically and pivotally mounted on the sled that, in response to a downwardly directed acceleration, the pawl is able to pivot out of the neutral position into the locking position. Even after a minimum displacement of the sled the eccentrically arranged pawl pivots, owing to its inertia, so far outward that it causes jamming of the sled laterally in the U-shaped rail and arrests the same so that, independently of the detent mechanism defined by the pawl, an additional breaking action is obtained.

In accordance with a preferred embodiment, detent surfaces are provided for the pawl on the inner side of that side flange which is engaged by the pawl, the detent surfaces additionally opposing displacement of the sled and ensuring rapid pivoting of the pawl, so that there is no possibility of the pawl's firstly having to slide a few millimeters along the inner side of the side flange before it pivots outwardly.

In accordance with a further embodiment of the invention, two oppositely pivotable pawls are present on the sled which in the locking position act on the opposite side flanges and mutual jam each other. Preferably, the two pawls are in this case pivotally mounted on a common shaft. In the locked the sled remains in this embodiment and in the loades condition substantially unloaded by the forces exerted by the jamming of the pawls because the force exerted by a pawl is introduced directly by way of the shaft on the other pawl and vice versa.

A further embodiment contemplates an arrangement such that in the locking position, in which it engages a side flange that a detent nose on the sled engages one of several mutually spaced recesses in the opposite side flange. In this embodiment, which preferably operates by using only one pawl the sled is displaced laterally so that, by means of its detent nose, the sled itself contributes to its locking. The recesses are preferably spaced apart by a minimum distance so that the amount of displacement for locking the sled is kept as small as possible.

The recesses may also be the detent openings in the rail so that no additional recesses are required. The detent mechanism provided on the sled will normally be so offset in relation to the detent nose that it engages into a detent opening not occupied by the detent nose.

DETAILED DESCRIPTION OF PREFERRED EMBODIMENTS

Figure 1:
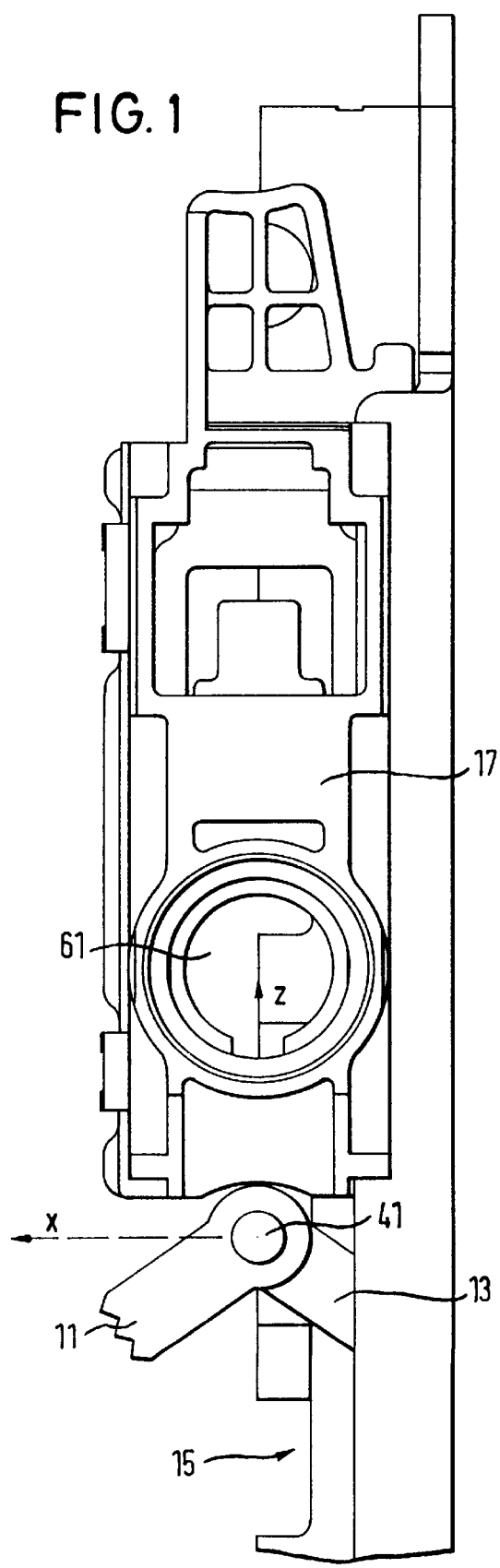
FIG. 1 shows a lateral elevation of a first embodiment of the belt height adjuster of the invention, the left part of the U-shaped rail being shown cut away.
Figure 2:
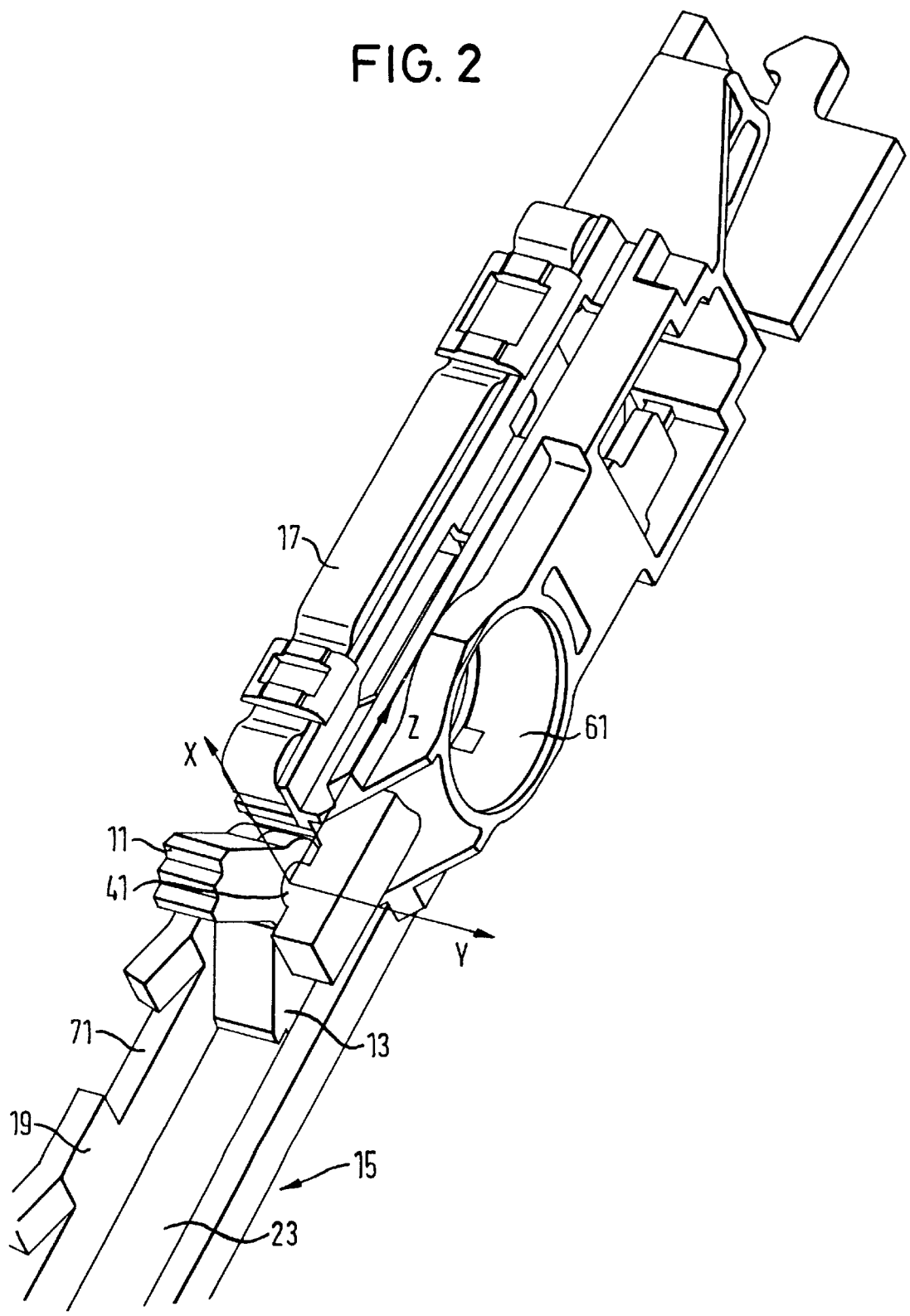
FIG. 2 is a perspective view of the belt height adjuster of FIG. 1, also without the left part of the U-shaped rail.

In FIGS. 1 and 2, a first embodiment of a belt height adjuster is shown which includes a U-shaped, vehicle-fixed rail 15 and a sled 17 shiftable along it. The U-shaped rail 15 comprises two opposite side flanges whereof solely the right transverse flange 23 is illustrated in FIG. 2. The two side flanges are connected together by a transverse flange or web 19, in which detent openings 71 are provided for a detent mechanism (not illustrated) on the sled 17. By actuation of the detent mechanism it is possible for the sled 17 to be run along in the longitudinal direction of the U-shaped rail 15 in relation to the vehicle upwardly and downwardly until it engages another detent opening 71. An opening 61 in the sled 17 serves for mounting a pin, not illustrated in FIGS. 1 and 2, with a deflector fitting for a safety belt.

A shaft 41 is molded on the sled 17 on which pivotally and eccentrically two pawls 11 and 13 are mounted. In the neutral position depicted in FIG. 1, in which, when the detent mechanism is released, the sled 17 is able to be vertically adjusted, the left hand pawl 11 extends as far as a point near the left hand side flange of the U section rail 15 and the right hand pawl 13 extends as far as a point near the right side flange 23. At their front ends facing the side flanges catch edges are provided on each pawl 11 and 13 to improve engagement with the respective side flange.

If in an accident the sled 17 is accelerated downwardly for example by a belt pretensioner and if the detent mechanism is not latched in a detent opening 71 but rather lies between two adjacent detent openings 71, the sled 17 would normally be displaced as far as the lower adjacent detent opening 71, so that the safety belt would not ensure any immediate restraining of the vehicle occupant. In order to prevent displacement the two pawls 11 and 13 pivot upwardly about their pivot shaft 41 owing to their inertia in opposite directions in relation to the downwardly displaced sled 17 so that the pawls abut against the side flange associated with them and mutually jam each other, and the sled 17 cannot move downwardly any further. The sled 17 will only move a few millimeters downwardly and not a few centimeters as is the case with a sled without any pawls 11 and 13. The force able to be taken up by the pawl mechanism is extremely high since the pawls 11 and 13 mutually jam each other just before reaching their dead center position in which they are arranged at a right angle to the vertical.

Figure 3:
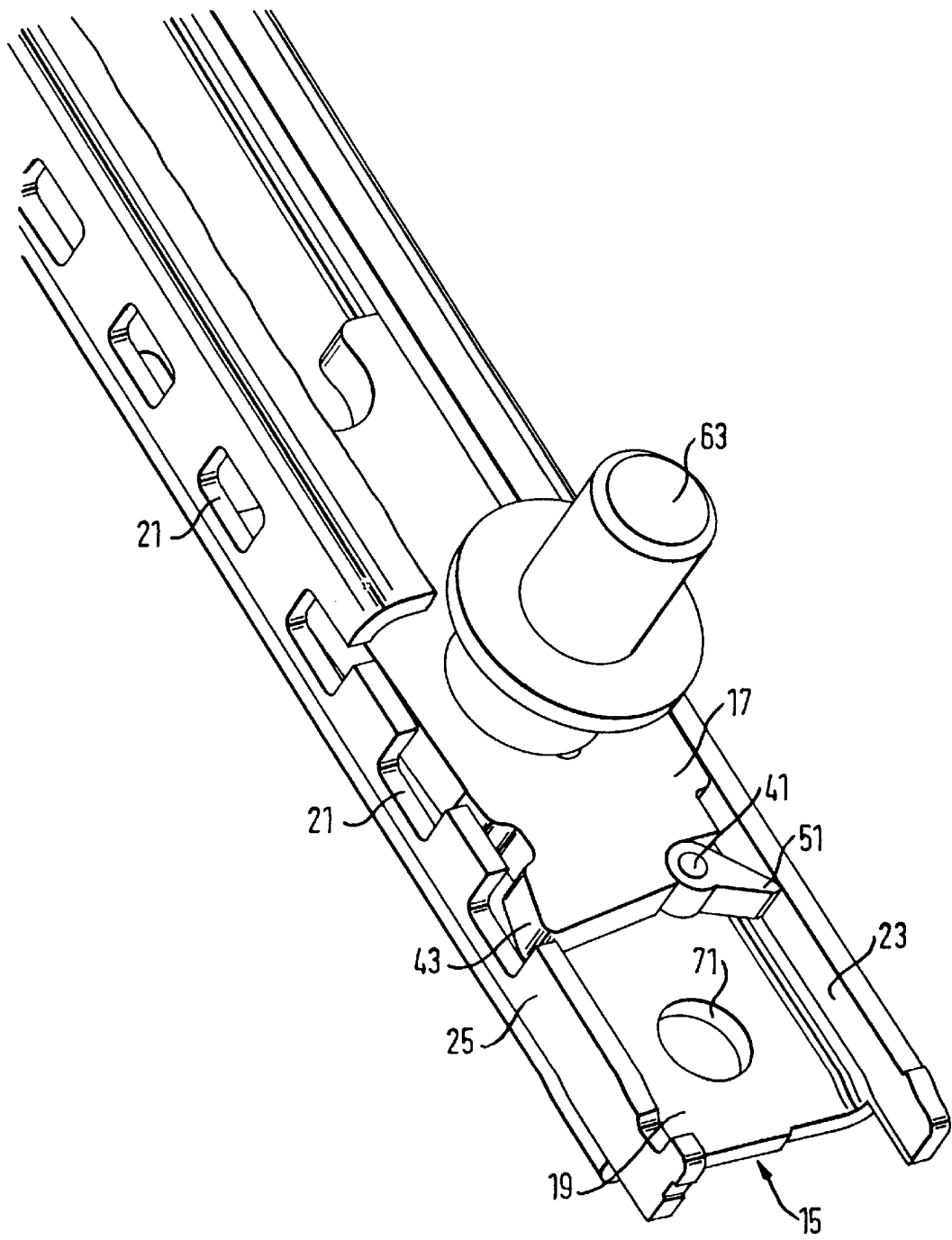
FIG. 3 is a perspective view of a second embodiment of the novel belt height adjuster according to the invention.
Figure 4:
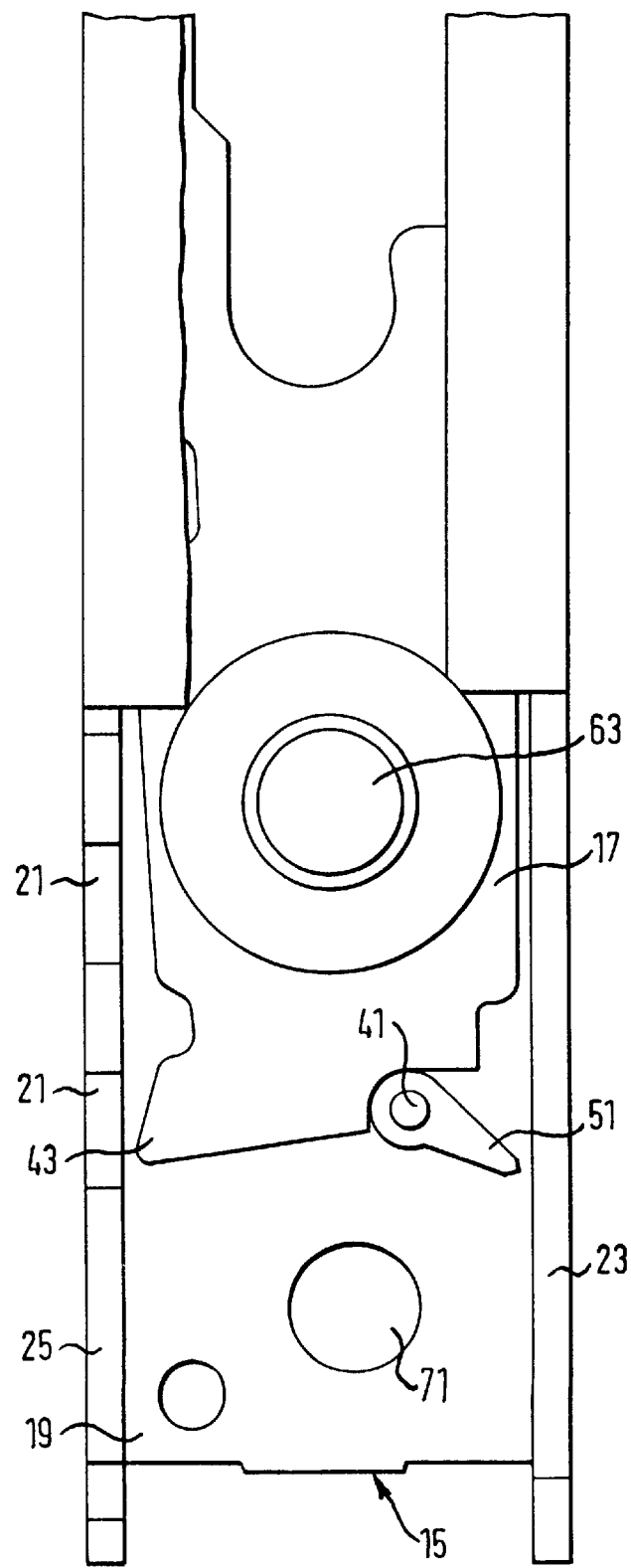
FIG. 4 is a plan view of the belt height adjuster depicted in FIG. 3.

The second form of embodiment of the belt height adjuster is illustrated in FIGS. 3 through 5 and comprises a sled 17 on which a pin 63 is secured for pivotally mounting a deflector fitting, not illustrated. In its transverse web 19, the U-shaped rail 15 has a plurality of evenly spaced out detent openings 71 and furthermore recesses 21 on the left hand side flange 25 of the U-shaped rail 15. The recesses 21 have a smaller spacing between each other than the detent openings 71. A detent nose 43 molded on the left hand bottom end of the sled 17 is so designed that on displacement of the sled 17 to the left it may engage the recesses 21. On the right hand bottom end of the sled 17 such rider comprises a molded on shaft 41 on which a pawl 51 is eccentrically mounting. In the neutral position, illustrated in FIGS. 3 and 4, of the belt height adjuster, the free end of the pawl almost touches the left hand side flange 23.

Should the sled 17 not be so exactly vertically aligned that the detent mechanism (not illustrated) snaps into a corresponding detent opening 71, the sled 17 will, in case of an accident, be accelerated at a high rate downwardly and the eccentrically pivoted pawl 51 will swing, owing to its inertia, upwardly counter-clockwise, will engage the right hand side flange 23 and will accordingly shift the sled 17 a little to the left. If in this case the sled 17 is in such a position that the detent nose 43 is at the same level as a recess 21, the detent nose 43 will positively engage this recess 21 and accordingly prevent any further motion of the sled 17. If the detent nose 43 is located between two recesses 21 at the beginning of acceleration of the sled 17, the pawl 51 which is pivoted slightly upward will shift the sled 17 together with its detent nose 43 so far to the left that same abuts against the left side flange 25 and the sled 17 jams in the U-shaped rail.

Furthermore, it is possible for the recesses 21 to coincide with the detent openings 71, if the openings are provided on the side flange 25.

Figure 5A:
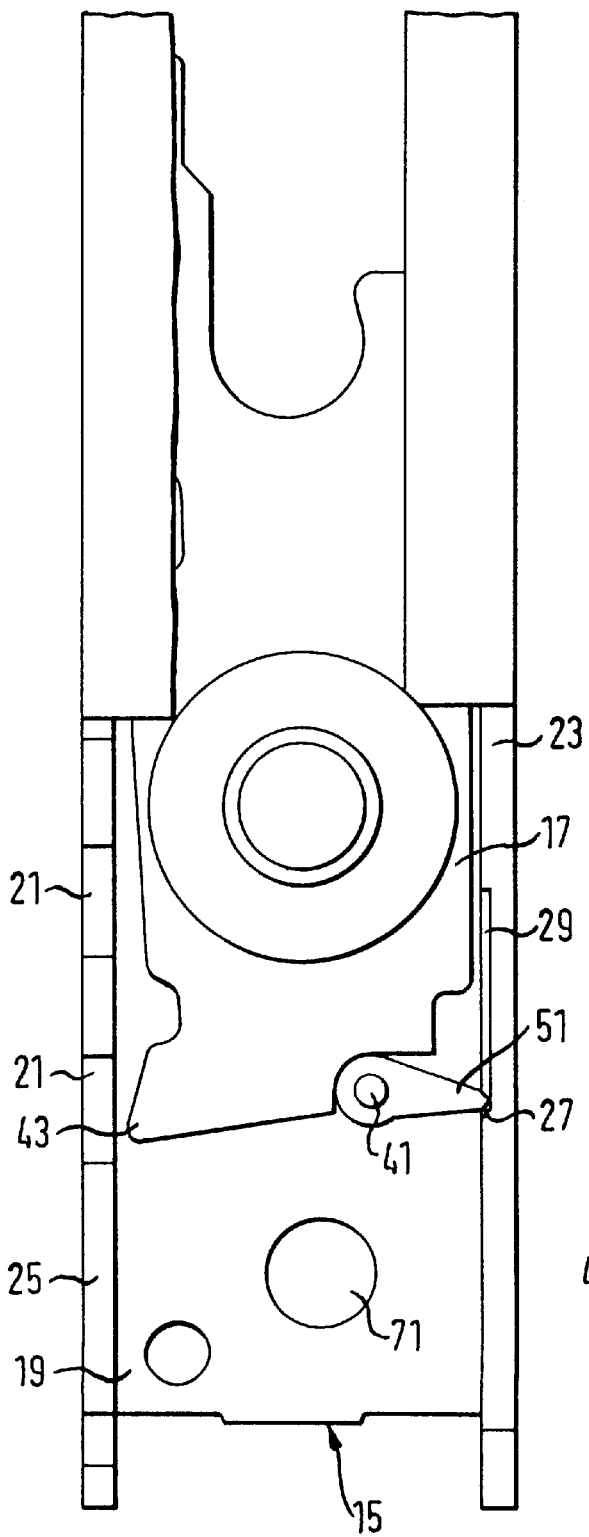
FIGS. 5a through 5c show possible further designs of the belt height adjuster of FIGS. 3 and 4 in plan view and in a more detailed fashion.
Figures 5B, 5C:
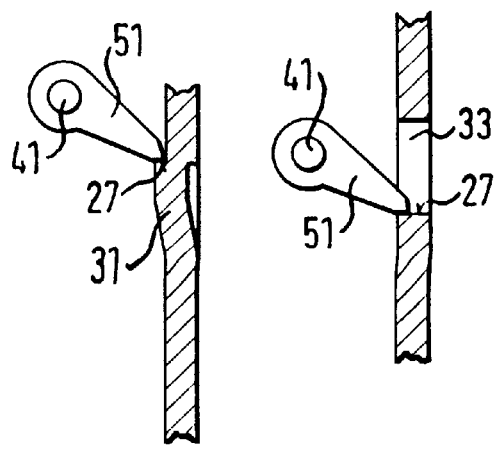

Furthermore, as shown in FIGS. 5a through 5c, detent surfaces 27 can be provided on the inner side of the side flange 23 engaged by the pawl 51, such surfaces being spaced by set amounts and preventing slipping of the pawl 51 and additionally displacement of the sled 17 when the pawl 51 is resting on a detent surface 27.

The detent surfaces 27 extend normally to the inner side of the side flange 23 and may, as shown in FIG. 5a, be produced by having a recess 29 or, as shown in FIG. 5b, by having an inwardly directed embossed structure 31. It is also clearly possible to provide outwardly directed embossed structures. It is further possible for the detent surfaces 27 to be constituted by through openings as shown in FIG. 5c in the form of the opening 33.

We claim:

1. A belt height adjuster for a vehicle safety belt system, comprising a U-shaped, vehicle-fixed rail and a sled adapted to slide in said rail, said rail having side flanges, a transverse flange and detent openings, said sled comprising at least one pawl and a pin extending perpendicularly to said transverse flange, said pawl being eccentrically and pivotally mounted on said sled by means of said pin and, in response to a downwardly directed acceleration, being movable from a neutral position in which displacement of said sled is permitted into a locking position in which said pawl engages one of said side flanges and jams said sled in said rail, at least one of said side flanges having an inner side with detent surfaces engageable by said pawl to additionally oppose displacement of said sled, said detent surfaces being defined by embossed structures and being directed outwardly or inwardly.

2. A belt height adjuster for a vehicle safety belt system, comprising a U-shaped, vehicle-fixed rail and a sled adapted to slide in said rail, said rail having side flanges, a transverse flange and detent openings, said sled comprising at least one pawl and a pin extending perpendicularly to said transverse flange, said pawl being eccentrically and pivotally mounted on said sled by means of said pin and, in response to a downwardly directed acceleration, being movable from a neutral position in which displacement of said sled is permitted into a locking position in which said pawl engages one of said side flanges and jams said sled in said rail, at least one of said side flanges having an inner side with detent surfaces engageable by said pawl to additionally oppose displacement of said sled, said detent surfaces being defined by recesses in at least one of said flanges.

3. A belt height adjuster for a vehicle safety belt system, comprising a U-shaped, vehicle-fixed rail and a sled adapted to slide in said rail, said rail having side flanges, a transverse flange and detent openings, at least one of said side flanges having several mutually spaced recesses, said sled comprising a detent nose, at least one pawl and a pin extending perpendicularly to said transverse flange, said pawl being eccentrically and pivotally mounted on said sled by means of said pin and, in response to a downwardly directed acceleration, being movable from a neutral position in which displacement of said sled is permitted into a locking position in which said pawl engages one of said side flanges and jams said sled in said rail, said pawl causing a lateral displacement of said sled in said locking position in which it engages one of said side flanges such that said detent nose engages one of said recesses.

4. The belt height adjuster as claimed in claim 3, wherein said recesses are said detent openings in said U-shaped rail.

5. A belt height adjuster for a vehicle safety belt system, comprising a U-shaped, vehicle-fixed rail and a sled adapted to slide in said rail, said rail having side flanges, a transverse flange and detent openings, said sled comprising at least one pawl and a pin extending perpendicularly to said transverse flange, said pawl being pivotally mounted on said sled by means of said pin and being movable from a neutral position in which displacement of said sled is permitted into a locking position in which said pawl engages one of said side flanges and jams said sled in said rail when none of the openings in the flanges are engaged by the sled, said pawl being so eccentrically and pivotally mounted on said sled that, in response to a downwardly directed acceleration, said pawl is able to pivot out of said neutral position into said locking position.

6. The belt height adjuster as claimed in claim 5, wherein at least one of said side flanges has an inner side with detent surfaces engageable by said pawl, such detent surfaces additionally opposing displacement of said sled.

7. The belt height adjuster as claimed in claim 6, wherein said detent surfaces are defined by recesses in at least one of said side flanges.

8. The belt height adjuster as claimed in claim 6, wherein said detent surfaces are defined by through openings in at least one of said side flanges.

9. The belt height adjuster as claimed in claim 5, wherein two oppositely pivotable pawls are provided on said sled which engage said opposite side flanges in said locking position and mutually jam each other.

10. The belt height adjuster as claimed in claim 9, wherein said pawls have a common shaft on which they are pivotally mounted.

\* \* \* \* \*